US006579946B2

(12) United States Patent
Chau

(10) Patent No.: US 6,579,946 B2
(45) Date of Patent: Jun. 17, 2003

(54) LOW-GLOSS BIAXIALLY ORIENTED FILMS COMPRISING VINYL AROMATIC POLYMERS AND SUBSTANTIALLY NON-SPHERICAL RUBBER PARTICLES

(75) Inventor: Chieh-Chun Chau, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/043,619

(22) Filed: Jan. 10, 2002

(65) Prior Publication Data

US 2002/0143107 A1 Oct. 3, 2002

Related U.S. Application Data

(60) Provisional application No. 60/266,132, filed on Feb. 2, 2001.

(51) Int. Cl.$^7$ .................................................. C08J 5/00
(52) U.S. Cl. ...................... 525/214; 525/232; 525/238; 525/240; 525/241
(58) Field of Search ............................... 525/214, 232, 525/238, 240, 241

(56) References Cited

U.S. PATENT DOCUMENTS

| | | | |
|---|---|---|---|
| 4,097,549 A | 6/1978 | Kruse | |
| 4,214,056 A | 7/1980 | Lavengood | |
| 4,334,039 A | 6/1982 | Dupre | |
| 5,237,004 A | 8/1993 | Wu et al. | |
| 5,270,386 A | 12/1993 | Laughner | |
| 5,346,954 A | 9/1994 | Wu et al. | |
| 5,591,279 A | * 1/1997 | Midorikawa et al. | .... 152/209.4 |
| 5,643,664 A | 7/1997 | Kwong et al. | |
| 5,852,124 A | 12/1998 | Wang et al. | |
| 5,981,047 A | 11/1999 | Wilkie | |

FOREIGN PATENT DOCUMENTS

| | | |
|---|---|---|
| CA | 5254332 | 6/1999 |
| EP | 0 230 760 B1 | 3/1992 |
| EP | 0 342 283 B1 | 2/1993 |
| EP | 0 418 042 B1 | 2/1994 |
| EP | 0 413 801 B1 | 5/1994 |
| EP | 0 096 447 B1 | 9/1996 |
| EP | 0 143 500 B2 | 7/2000 |
| JP | 58052239 | 3/1983 |
| JP | 06 116405 A | 4/1994 |
| JP | 09 208717 A | 12/1997 |
| WO | 97 09372 A | 3/1997 |
| WO | 98/46678 | 4/1998 |
| WO | 00/31182 | 1/1999 |
| WO | 99 43740 A | 9/1999 |

* cited by examiner

*Primary Examiner*—Nathan M. Nutter
(74) *Attorney, Agent, or Firm*—Steven W. Mark

(57) ABSTRACT

A low-gloss biaxially oriented polymer film containing a vinyl aromatic polymer and substantially non-spherical rubber particles is useful for window film applications. The rubber particles, when unconstrained, are essentially spherical and have a rubber particle size of 2.5 micrometers or more.

11 Claims, No Drawings

LOW-GLOSS BIAXIALLY ORIENTED FILMS COMPRISING VINYL AROMATIC POLYMERS AND SUBSTANTIALLY NON-SPHERICAL RUBBER PARTICLES

CROSS-REFERENCE STATEMENT

This application claims the benefit of U.S. Provisional Application No. 60/266,132, filed Feb. 2, 2001.

BACKGROUND OF THE INVENTION

1. Field of the Invention

The present invention relates to low-gloss biaxially oriented polymer films comprising a vinyl aromatic polymer and substantially non-spherical rubber particles. "Low-gloss" films have a 60-degree (°) gloss of less than 80, as measured according to American Society for Testing and Materials (ASTM) method D-2457.

2. Description of Related Art

Low-gloss films are useful as window films for mailing envelopes. Window films are clear polymeric films that cover an opening in an envelope. Window films allow reading of addresses that are enclosed within an envelope. Optical character reading (OCR) devices are useful for reading addresses in automated mail sorting systems, but OCR accuracy is affected by film gloss. OCR device accuracy typically decreases when window film gloss increases. Therefore, low-gloss window films facilitate accurate sorting of mail when using OCR devices.

Altering, or roughening, the surface of a polymer film is one way to reduce its gloss. Unfortunately roughening the surface also typically increases film haze, decreasing optical clarity through the film.

Additives, such as rubber modifiers and inorganic fillers, can also reduce the gloss of a polymeric film. Additives are normally included at concentrations of 2 weight-percent (wt %) or higher, based on film weight. Additives tend to affect film properties other than gloss. For example, a film's haze typically increases with increasing concentration of polymeric modifiers in the film. Additives may also increase directional gloss differential (DGD) and surface gloss differential of a film. DGD is a difference in gloss in a machine direction (MD) relative to a transverse direction (TD) on a single film surface. MD is a direction parallel to a direction that a film travels during production. TD is a direction perpendicular to MD and parallel to a film surface. Surface gloss differential (SGD) is a difference in gloss between opposing film surfaces. Measure SGD either in MD or TD, as long as the direction is the same on both surfaces. Increasing SGD and DGD values are unattractive because they correspond to a less homogeneous film gloss. Increasing haze is unattractive for window films because it hinders visibility through the film.

A low-gloss film comprising less than 2 wt % additive, based on film weight, is desirable. Such a film that further has at least one of the following characteristics is even more desirable: a SGD of 25 or less; a DGD of 15 or less; a haze value of 30 or less when measured on a 1.15 mil (29.2 $\mu$m) thick film.

BRIEF SUMMARY OF THE INVENTION

In a first aspect, the present invention is a polymer film comprising a vinyl aromatic polymer and rubber particles, wherein said rubber particles: (a) have an aspect ratio greater than five; (b) have an unconstrained particle size of at least 2.5 micrometers; and (c) are present at a concentration of less than 2 weight-percent, based on film weight; and wherein said polymer film is biaxially oriented and has a 60-degree gloss of less than 80 in both the machine and transverse direction on both sides of the film, as measured by American Society for Testing and Materials method D-2457.

In a second aspect, the present invention is a polymer film comprising a blend of general purpose polystyrene and high impact polystyrene, wherein said film contains rubber particles that: (a) have an aspect ratio greater than five; (b) have an unconstrained particle size of at least 2.5 micrometers; and (c) are present at a concentration of less than 2 weight-percent, based on film weight; and wherein said polymer film is biaxially oriented and has a 60-degree gloss of less than 80 in both the machine and transverse direction on both sides of the film, as measured by American Society for Testing and Materials method D-2457.

Preferably, the films of the first and second aspects have as least one of the following additional characteristics: (d) a surface gloss differential less than 25; (e) a directional gloss differential less than 15; and (f) a haze value of 30 or less, when measured on a 1.15 mil (29.2 micrometer) thick film.

In a third aspect, the present invention is an envelope comprising at least two materials; wherein at least one of said materials is the film of the first or second aspect.

The present invention meets a need in the art by providing a low-gloss film comprising less than 2 weight-percent (wt %) additive, based on film weight.

DETAILED DESCRIPTION OF THE INVENTION

Herein, specified ranges include range endpoints unless otherwise indicated.

The present invention is a biaxially oriented low-gloss polymer film comprising a vinyl aromatic polymer (VAP) and substantially non-spherical rubber particles.

The films of the present invention have a 60° gloss in both machine and transverse direction on both sides of the film of less than 80, preferably 75 or less, more preferably 70 or less, most preferably 65 or less. Films having gloss values of less than 80 allow OCR devices to read through them more accurately than films having gloss values of 80 or higher.

Concomitantly, the films of the present invention preferably have a SGD of 25 or less, preferably 20 or less, more preferably 15 or less in both MD and TD. Films also preferably have a DGD of 15 or less, preferably 10 or less, more preferably 7 or less on each side. Films having SGD values greater than 25 and DGD values greater than 15 are less attractive because their gloss is highly dependent on film orientation. As a result, OCR accuracy when reading through such films would be dependent upon the orientation of the film.

Films of the present invention desirably have a haze value of 30 or less, preferably 27 or less, more preferably 24 or less when measured on a 1.15 mil (29.2 $\mu$m) thick film according to ASTM method D-1003.

Biaxially oriented films of the present invention include substantially non-spherical rubber particles. Substantially non-spherical rubber particles have a largest dimension (L), shortest dimension (T), and a third dimension (W). L, T, and W are mutually perpendicular and traverse the center of the particle. L and W are parallel, or essentially parallel to a film surface. "Essentially parallel" means within 45° of parallel. T is perpendicular, or essentially perpendicular to a film surface. "Essentially perpendicular" means within 45° of perpendicular. Substantially non-spherical rubber particles each have an aspect ratio and a major cross sectional area (MCSA). The aspect ratio is equal to L divided by T. The MCSA is $\pi(L+W)^2/16$.

Substantially non-spherical rubber particles have an aspect ratio in both the machine direction and transverse direction (defined below) greater than five, preferably greater than 10, more preferably greater than 30, still more preferably greater than 50. Theoretically, there is no maximum for the aspect ratio. Higher aspect ratios are more desirable than lower aspect ratios for particles within a film because higher aspect ratios typically correspond to a lower film gloss.

Measure an aspect ratio of a rubber particle using a transmission electron microscope (TEM) image of a cross section of the rubber particle. Expose the cross section by cutting a film perpendicular to a film surface and parallel to either the machine direction (defined below) or transverse direction (defined below). Cutting the film parallel to the machine direction reveals rubber particle aspect ratios in the machine direction. Cutting a film parallel to the transverse direction reveals rubber particle aspect ratios in the transverse direction.

Film gloss for the films of the present invention is a function of the MCSA of rubber particles therein. Increasing the MCSA of rubber particles within a film typically decreases the film's gloss. Increasing the aspect ratio of the rubber particles also tends to increase the MCSA.

The MCSA and aspect ratio of rubber particles within a film typically increase by stretching a film in one direction, preferably two perpendicular directions parallel to the film's surface. Hence, biaxially orienting a film increases the MCSA and aspect ratio of rubber particles in the film, thereby reducing the film's gloss.

Characterize film stretching with a draw ratio. A draw ratio is a pre-stretched distance divided by a post-stretched distance. For example, a film has a certain pre-stretched length L and pre-stretched width W. After stretching the film along its length and width, the post-stretched length is L' and the post-stretched width is W'. Hence, L'/L is a draw ratio along the length and W'/W is a draw ratio along the width of the film.

Films of the present invention are biaxially oriented. Biaxial orientation is the result of stretching a film to a draw ratio of 2 or more, preferably 3 or more in two orthogonal axes in a plane containing the film surface. Higher draw ratios are desirable since they typically result in lower gloss films than lower draw ratios, for films within the scope of this invention. Draw ratios below 2 often fail to produce substantially non-spherical rubber particles. Too high of a draw ratio tends to rupture a film. Normally, the draw ratio in each direction is less than 15.

Measure a draw ratio of a biaxially oriented film after manufacture by marking the film with two sets of lines; one set parallel to the MD and the other set parallel to the TD. Measure the length of the lines to establish their pre-annealed length, then anneal the film for one hour in an oven at an annealing temperature 15° C. above the glass transition temperature of the VAP in the film. Again measure the length of the lines to determine their post-annealed length. The pre-annealed length of a line divided by its post-annealed length is the draw ratio for the biaxially oriented film along the axis in which the line was drawn.

The biaxially oriented film constrains rubber particles therein into their substantially non-spherical shape. Rubber particles are substantially spherical when unconstrained by the film. "Substantially spherical" particles have an aspect ratio of less than five.

Suitable rubber particles have an unconstrained particle size of 2.5 $\mu$m or more, preferably 3 $\mu$m or more, more preferably 4 $\mu$m or more. Rubber particles having an unconstrained particle size less than 2.5 $\mu$m are too small to produce a gloss in the desired range at the rubber concentrations of the present invention. While there is no practical upper limit, the unconstrained particle size is generally 10 $\mu$m or less. The unconstrained rubber particles may have either a multimodal or monomodal particle size distribution.

Low-gloss films containing large rubber particles (2.5 $\mu$m or greater in size) have more than one performance advantage over low-gloss films containing only small rubber particles (less than 2.5 $\mu$m in size). For films having equal gloss values (according to ASTM method D-2457), one prepared with only small rubber particles and one prepared with large rubber particles, the film with large rubber particles generally: (1) require a lower rubber concentration; (2) are less sensitive to processing conditions, therefore are easier to make with a consistent gloss value; and (3) have a softer satin appearance that renders inhomogeneities in a film less obvious.

Determine an unconstrained particle size for rubber particles within a film by dissolving enough film into a one wt % solution of ammonium thiocyanate in dimethyl formamide to form a cloudy solution, then measure the particle size using a Beckman-Coulter multisizer 2E using a 30 $\mu$m aperture.

The rubber particles typically comprise at least one alkadiene polymer. Suitable alkadienes are 1–3-conjugated dienes such as butadiene, isoprene, chloroprene, or piperylene. Preferably, the polymer is a homopolymer of 1,3-conjugated dienes, with such homopolymers of 1,3-butadiene being especially preferred. Alkadiene copolymer rubber containing small amounts, for example less than 15, preferably less than 10 wt % of other monomers such as monovinylidene aromatics are also suitable.

The rubber particles are preferably free of a core-shell structure wherein the particles have a polymeric core phase and at least one polymeric shell phase (see, for example U.S. Pat. No. 5,237,004 at column 7 line 1 through column 9 line 2, incorporated herein by reference).

Suitable rubber particle concentrations in the presently disclosed films are less than 2 wt %, preferably 1.8 wt % or less, more preferably 1.5 wt % or less, based on film weight.

The lower limit of rubber particle concentration depends upon the unconstrained particle size of the rubber. Particles having a larger unconstrained particle size can produce a film having acceptable gloss and haze properties at lower concentrations than particles having a smaller unconstrained particle size. Generally, the concentration of rubber particles is greater than 0.5 wt %, beneficially greater than 0.8 wt %, and preferably greater than 1.0 wt %, based on the total film weight. Films of the present invention preferably contain less than 0.5 wt % fillers other than rubber particles, based on film weight.

Suitable VAPs include polymers of vinyl aromatic monomers such as styrene and alkyl or aryl ring-substituted styrenes, such as para-methylstyrene, para-tertiary-butyl styrene. Suitable VAPs also include copolymers of vinyl aromatic monomers and monomers such as acrylonitrile, methacrylonitrile, methacrylic acid, methyl methacrylate, acrylic acid, methyl acrylates, maleimide, phenylmaleimide, and maleic anhydride. Preferably, the VAP is polystyrene.

One variation of the present invention contains high impact polystyrene (HIPS). HIPS is a blend of alkadiene rubber in polystyrene. HIPS is polystyrene either copolymerized or admixed with an alkadiene rubber. Typically, HIPS has a rubber concentration greater than 2 wt %, based on resin weight. Blending general-purpose polystyrene with HIPS is one way to form a VAP-rubber particle combination suitable for forming films of the present invention.

Any film manufacturing process is suitable for preparation of films of the present invention including solution cast with subsequent biaxial orientation, cast tentering, and blown processes. Blown processes include those wherein the polymer bubble is blown in any direction including upward, downward, or horizontally. A blown film is a product of a blown process.

Films of the present invention typically have a thickness of 10 µm or greater, desirably 20 µm or greater, preferably 30 µm or greater, and typically 250 µm or less preferably 100 µm or less, more preferably 80 µm or less. Achieving a rubber particle aspect ratio within the desired range is difficult for films thicker than 250 µm. Films thinner than 10 µm tend to break during manufacture.

Films of the present invention are particularly useful as window films in envelopes. Typically envelopes with window films comprise at least two materials including a primary wrapping material and a window film. Primary wrapping materials include paper as well as woven and non-woven polymers such as polyesters.

The following example further illustrates the present invention and does not limit the scope of the invention in any way.

EXAMPLE (EX) 1

Blown Film

Prepare a blend of general-purpose polystyrene (such as STYRON* 685 polystyrene resin from The Dow Chemical Company) and a HIPS having rubber particles with a 4.5 µm particle size (such as ATEK* 1170 HIPS resin from The Dow Chemical Company, which has a rubber particle concentration of 8.5 wt % relative to resin weight) in an extruder at 400° F. (204° C.) to form a molten polymer blend. The ratio of general-purpose polystyrene to HIPS is sufficient to achieve a rubber particle concentration in the molten polymer blend of 1.28 wt % based on total blend weight.

Prepare Ex 1 by blowing the molten polymer blend into a film. Blow the molten polymer blend through an annular die at a polymer flow rate of between 2.5 and 125 feet per minute (0.76 to 38.1 meters per minute) to establish a bubble with a maximum bubble diameter. The annular die has a diameter such that the ratio of the maximum bubble diameter to the annular die diameter is three. Flow air at a temperature less than 80° C. uniformly over the bubble to cool the film below 100° C. prior to collecting. Collect the resulting film at a winding rate between 10 and 500 feet per minute (3 to 152 meters per minute) such that the ratio of the winding rate to polymer flow rate is four. The resulting film is has thickness of 1.15 mil (29.2 µm).

Allow Ex 1 to cool to room temperature and measure haze according to ASTM method D1003 and 600 gloss according to ASTM method D2457. Measure 602 gloss in both machine direction (MD) and transverse direction (TD) for both sides (side 1 and side 2) of the film. Measure a rubber particle aspect ratio using a TEM image viewing a film section parallel to the film surface. Measure the draw ratios using an annealing temperature of 115° C. Table 1 shows the results for Ex 1.

TABLE 1

Film properties for Ex 1.

| | |
|---|---|
| Unconstrained particle size | 4.5 µm |
| Rubber particle aspect ratio | 77 |
| Draw ratio (MD) | 7.0 |
| Draw ratio (TD) | 4.0 |
| Haze value | 20 |
| 60° gloss Side 1 MD | 70 |
| 60° gloss Side 1 TD | 62 |
| 60° gloss Side 2 MD | 63 |
| 60° gloss side 2 TD | 50 |
| Surface gloss differential MD | 7 |
| Surface gloss differential TD | 12 |
| Directional gloss differential Side 1 | 8 |
| Directional gloss differential Side 2 | 13 |

Ex 1 illustrates a polystyrene-based film of the present invention.

Ex 1 is only an example of one film composition. Films of other disclosed compositions and manufacturing processes will also form films of the present invention.

What is claimed is:

1. A polymer film comprising a vinyl aromatic polymer and rubber particles, wherein said rubber particles:
   (a) have an aspect ratio greater than five;
   (b) have an unconstrained particle size of at least 2.5 micrometers;
   (c) are present at a concentration of less than 2 weight-percent, based on film weight; and
   wherein said polymer film is biaxially oriented and has a 60-degree gloss of less than 80 in both the machine and transverse direction on both sides of the film, as measured by American Society for Testing and Materials method D-2457.

2. The film of claim 1, wherein said film has a surface gloss differential of 25 or less.

3. The film of claim 1, wherein said film has a directional gloss differential of 15 or less.

4. The film of claim 1, wherein said film has a haze value of 30 or less, when measured on a 1.15 mil (29.2 micrometer) thick film.

5. The film of claim 1, wherein said film has:
   (d) a surface gloss differential less than 25;
   (e) a directional gloss differential less than 15; and
   (f) a haze value of 30 or less, when measured on a 1.15 mil (29.2 micrometer) thick film.

6. The film of claim 1, wherein said film has a draw ratio of at least 2 in each of two orthogonal axes in a plane containing a film surface.

7. The film of claim 1, wherein said vinyl aromatic polymer is polystyrene.

8. The film of claim 1, wherein said rubber particles are selected from the group consisting of polybutadiene, polybutadiene-polystyrene copolymers, and styrene-acrylonitrile-butadiene copolymers.

9. A polymer film comprising a blend of general purpose polystyrene and high impact polystyrene, wherein said film contains rubber particles that:
   (a) have an aspect ratio greater than five;
   (b) have an unconstrained particle size of at least 2.5 micrometers;
   (c) are present at a concentration of less than 2 weight-percent, based on film weight; and
   wherein said polymer film is biaxially oriented and has a 60-degree gloss of less than 80 in both the machine and transverse direction on both sides of the film, as measured by American Society for Testing and Materials method D-2457.

10. An envelope comprising at least two materials, wherein at least one of said materials is the film of claim 1.

11. An envelope comprising at least two materials, wherein at least one of said materials is the film of claim 9.

* * * * *